Patented Jan. 7, 1930

1,742,674

UNITED STATES PATENT OFFICE

FOORD VON BICHOWSKY, OF GLENDALE, CALIFORNIA, ASSIGNOR TO TITANIA CORPORATION, OF LOS ANGELES, CALIFORNIA, A CORPORATION OF CALIFORNIA

TITANIUM OXIDE AND PROCESS OF PRODUCING SAME

No Drawing.   Application filed June 15, 1927. Serial No. 199,135.

This invention relates to synthetic titanium nitrogen compounds as new reactive materials and an improved process of preparing titanium oxide and titanium oxide containing materials through the employment of said reactive titanium nitrogen compounds, and has for its primary object the utilization of titanium nitrogen compounds which will be readily attacked by nitric acid and oxidized thereby in contradistinction to known characteristics of titanium nitrogen compounds which are not subject to attack by nitric acid.

It is known, (Comptes rendus vol. 82, p. 974), that "the titanium nitride obtained through heating titanium dioxide in a current of dry ammonia gas is soluble in boiling concentrated sulphuric acid"; and in Zeit., anorg. und allgem., Chem., vol. 143, part 4, p. 299, we find that the nitride of titanium prepared by heating titanium oxide with carbon in the presence of nitrogen gas is unattacked by boiling sulphuric acid.

Prepared according to either of the above noted ways, the nitride corresponds to the formula $Ti_2N_2$.

It is further observed, Zeit., anorg. und allgem., Chem., vol. 143, part 4, p. 299, that "titanium nitride of the above composition is unattacked by nitric acid and that (Textbook of Inorganic Chemistry, vol. 5, edition of 1917, edited by Friend, page 254) "cyanonitride $Ti_{10}C_2N_8$ is also unaffected by this acid."

I have discovered that the nitride of titanium as prepared by the process recited in United States Letters Patent No. 1,408,661, dated March 7, 1922, through the catalytic action of iron and sodium carbonate upon titanium oxide and carbon when heated in the presence of nitrogen, is not only easily acted upon by hot sulphuric acid, but, and in contradistinction to all known titanium nitrogen compounds, is readily attacked by even weak nitric acid. In view thereof, I will hereinafter refer to it as "reactive nitride" or "reactive titanium nitride" or "reactive titanium nitrogen compound", so as to differentiate it from the heretofore known and described titanium nitride ($Ti_2N_2$) or titanium cyanonitride ($Ti_{10}C_2N_8$).

As indicative of the advance which I have made in the art, it is said that—one gram of "reactive nitride" was heated in a water bath with 15 cc. of a weak nitric acid obtained by diluting one volume of nitric acid (sp. g. 1.42) with two volumes of water, to a temperature of about 60° C. In a few days the brass colored nitride was changed completely into the white dioxide with a resulting reaction as follows:

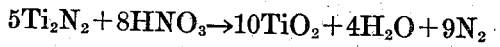

$$5Ti_2N_2 + 8HNO_3 \rightarrow 10TiO_2 + 4H_2O + 9N_2$$

I am able to obtain titanium oxide in an extremely fine state of division which may be used as a basis for a pigment or, because of its chemical reactivity, it may be used as a starting material from which to make other compounds. The reaction can be hastened by increasing the temperature or heat at greater or less than atmospheric pressure.

Advantage can be taken of this action of $HNO_3$ upon the reactive titanium nitride to bring the oxide of titanium as formed into solution with sulphuric acid. As an example: To a suspension of 1 gram of reactive nitride in 10 cc. of concentrated sulphuric acid held at 50° C. there is very gradually added 2 grams of sodium nitrate. At the end of 100 hours the sulphuric acid is allowed to cool and is then poured into 100 cc. of cold water. Practically all of the titanium goes into solution as titanium sulphate. By boiling this solution, the titanium therein contained can be precipitated as $TiO_2$.

In the above mentioned illustration, nitric acid is formed in the well known way, through the action of sulphuric acid upon the nitrate of soda. The nitric acid so formed, in turn, decomposes the reactive titanium nitride into titanium oxide which, being in a very active state, is readily converted by the $H_2SO_4$ present into titanium sulphate. In this instance, about one-third of the nitrogen of the nitride is converted into ammonia while the remainder is evolved as nitrogen gas which, as it escapes, serves to agitate the sulphuric acid and thus keep the material in suspension. If desired, mechanical agitation can also be supplemented.

One commercial application of the invention is as follows: Mix the reactive nitride with blanc fixe, in the desired proportion; in the precipitation tank, filter or settle the precipitate, and moisten the damp cake thus obtained with nitric acid and heat with or without stirring until the nitride is decomposed. Upon calcining the blanc fixe, containing the finely divided $TiO_2$, all excess $HNO_3$ is driven off and may be recovered.

I am thus able to obtain in this manner, and very cheaply, an excellent titanium oxide-barium sulphate mixture that only requires to be ground to render it suitable for use as a pigment or for other purposes.

Should the reactive titanium nitrogen compound contain a slight amount of iron, I add, towards the close of the reaction of the nitric acid upon it, a small amount of hydrochloric acid or chlorine or sulphuric acid, in order to bring any iron present into a soluble form. If the reactive nitride contains traces of chromium or vanadium compounds, the nitric acid treatment facilitates bringing these elements into solution.

In practicing the invention, it will be understood that I am not to be limited to the exact proportions of parts, times, temperatures or pressures, and that such variations can be resorted to as fall within the scope of the hereto appended claims.

What I claim as my invention is:

1. The process of producing titanium oxygen containing material from reactive titanium nitrogen compounds, which consists in acting upon these compounds with nitric acid.

2. The process of producing pure dioxide of titanium from reactive titanium nitrogen compounds which comprises heating said compounds in the presence of sulphuric acid and a metallic nitrate.

3. The process of producing pure dioxide of titanium from reactive titanium nitrogen compounds which comprises heating said compounds in the presence of sulphuric acid and sodium nitrate.

4. The process of producing pure dioxide of titanium from reactive titanium nitride $Ti_2N_2$ which comprises heating same in the presence of sulphuric acid and sodium nitrate.

5. The process of producing pure dioxide of titanium from pure reactive titanium nitrogen compounds which comprises acting upon said compounds with nitric acid in the presence of sulphuric acid.

FOORD von BICHOWSKY.